(12) United States Patent
Kim

(10) Patent No.: US 8,852,796 B2
(45) Date of Patent: Oct. 7, 2014

(54) SECONDARY BATTERY AND METHOD OF MANUFACTURING THE SAME

(75) Inventor: Joongheon Kim, Yongin-si (KR)

(73) Assignee: Samsung SDI Co., Ltd., Yongin-si, Gyeonggi-do (KR)

( * ) Notice: Subject to any disclaimer, the term of this patent is extended or adjusted under 35 U.S.C. 154(b) by 374 days.

(21) Appl. No.: 12/905,602

(22) Filed: Oct. 15, 2010

(65) Prior Publication Data

US 2011/0091766 A1  Apr. 21, 2011

(30) Foreign Application Priority Data

Oct. 15, 2009  (KR) .................. 10-2009-0098085

(51) Int. Cl.
*H01M 2/04* (2006.01)
*H01M 2/08* (2006.01)
*H01M 2/02* (2006.01)

(52) U.S. Cl.
CPC .......... *H01M 2/0404* (2013.01); *H01M 2/0287* (2013.01); *H01M 2/08* (2013.01); *H01M 2/0212* (2013.01); *H01M 2/021* (2013.01); *H01M 2/0275* (2013.01); *Y02E 60/12* (2013.01)
USPC .......................................... 429/176; 29/623.2

(58) Field of Classification Search
USPC .......................................... 429/176; 29/623.2
See application file for complete search history.

(56) References Cited

U.S. PATENT DOCUMENTS

| | | | |
|---|---|---|---|
| 2006/0093905 A1* | 5/2006 | Kim ............................... | 429/175 |
| 2006/0210872 A1 | 9/2006 | Yageta et al. | |
| 2007/0154799 A1 | 7/2007 | Yoon et al. | |
| 2009/0176156 A1 | 7/2009 | Lee | |

FOREIGN PATENT DOCUMENTS

| | | | | |
|---|---|---|---|---|
| EP | 1 102 336 A1 | 5/2001 | | |
| EP | 1 184 914 A1 | 3/2002 | | |
| EP | 1184914 A1 | * 3/2002 | .............. | H01M 2/02 |
| EP | 1 686 636 A1 | 8/2006 | | |
| JP | 60160568 A | 8/1985 | | |
| JP | 02-213046 | 8/1990 | | |
| JP | 09-063639 | 3/1997 | | |
| JP | 2001-199413 | 7/2001 | | |
| JP | 2001199413 A | * 7/2001 | .............. | B65B 51/10 |
| JP | 2001-229889 | 8/2001 | | |

(Continued)

OTHER PUBLICATIONS

Extended European Search Report dated Feb. 22, 2011 for corresponding EP Application No. 10187688.6-1227.

(Continued)

*Primary Examiner* — Karie O'Neill Apicella

(74) *Attorney, Agent, or Firm* — Knobbe Martens Olson & Bear LLP

(57) ABSTRACT

Disclosed are a secondary battery and a method of manufacturing the same. The method of manufacturing a secondary battery includes preparing a pouch case comprising a first case and a second case, seating an electrode assembly into the first case, covering the first case comprising a receiving part with the second case, and sealing a side portion of the first case and a side portion of the second case using a jig. The jig includes a first jig compressing the first case and a second jig compressing the second case. A first compressed width of the first case compressed by the first jig is less than a second compressed width of the second case compressed by the second jig.

13 Claims, 5 Drawing Sheets

(56) References Cited

FOREIGN PATENT DOCUMENTS

| | | |
|---|---|---|
| JP | 2001-357826 | 12/2001 |
| JP | 2002-260601 | 9/2002 |
| JP | 2005-038613 | 2/2005 |
| JP | 2005-108486 | 4/2005 |
| JP | 2006-040747 | 2/2006 |
| JP | 2006-093120 | 4/2006 |
| JP | 2006-134604 | 5/2006 |
| JP | 2009164102 | 7/2009 |
| KR | 1020040016701 | 2/2004 |
| KR | 2006-0027264 | 3/2006 |
| KR | 1020070035639 | 4/2007 |
| WO | WO 01/56093 | 8/2001 |

OTHER PUBLICATIONS

Notice of Allowance dated Dec. 22, 2011 for corresponding KR Application No. 10-2009-0098085.

Office Action dated Feb. 12, 2013 for corresponding JP Application No. 2010-167196.

Office Action dated Mar. 4, 2013 for corresponding CN Application No. 201010516651.8.

Notice of Allowance dated Jan. 21, 2014 for corresponding JP Application 2010-167196.

* cited by examiner

SECONDARY BATTERY AND METHOD OF MANUFACTURING THE SAME

CROSS-REFERENCE TO RELATED APPLICATION

This application claims priority to and the benefit of Korean Patent Application No. 10-2009-0098085, filed on Oct. 15, 2009, the entire content of which is incorporated herein by reference.

BACKGROUND

1. Field

Embodiments relate to a secondary battery and a method of manufacturing the same.

2. Description of the Related Art

Generally, Lithium ion secondary batteries may be classified into a polygonal-type secondary battery, a cylindrical-type secondary battery, and a pouch-type secondary battery according to a structure of a battery pack thereof.

The pouch-type secondary battery includes an electrode assembly and a pouch case surrounding the electrode assembly. In addition, the pouch-type secondary battery further includes a protective circuit module (PCM) and an exterior case, and thus will be commercialized as a battery pack.

The electrode assembly may be received into the pouch case, and then a sealing process for sealing a side portion of the pouch case using a jig may be performed to manufacture the pouch-type secondary battery.

SUMMARY

Embodiments are directed to a secondary battery and a method of manufacturing the same, which substantially overcomes one or more of the problems due to the limitations and disadvantages of the related art.

It is therefore a feature of an embodiment to provide an secondary battery in which, when an electrode assembly is received into a pouch case, and then a side portion of the pouch case is compressed, upwardly and downwardly compressed widths of the side portion of the pouch case may be different from each other to reduce the amount of the corrugation lines on the pouch case during the sealing process, thereby easily bending the side portion of the pouch case, and a method of manufacturing the same.

The object of the inventive concept is not limited to the aforesaid, but other objects not described herein will be clearly understood by those skilled in the art from descriptions below.

At least one of the above and other features and advantages may be realized by providing a method of manufacturing a secondary battery, the method including: preparing a pouch case comprising a first case and a second case; seating an electrode assembly into the first case; covering the first case comprising a receiving part with the second case; and sealing a side portion of the first case and a side portion of the second case using a jig, wherein the jig comprises a first jig compressing the first case and a second jig compressing the second case, and a first compressed width of the first case compressed by the first jig is less than a second compressed width of the second case compressed by the second jig.

The first compressed width may be a distance from an inner end of the side portion of the first case to a point spaced a certain distance from the inner end of the side portion of the first case, and the second compressed width may be substantially equal to a width of the side portion of the second case.

The first jig and the second jig may have the substantially same width.

The first jig may have a width less than that of the second jig.

The sealing of the side portions of the first and second cases may be performed in a state where an inner end of the first jig corresponds to a point spaced a certain distance from an inner end of the side portion of the first case, and an inner end of the second jig may correspond to an inner end of the side portion of the second case.

The sealing of the side portions of the first and second cases is performed in a state where an outer end of the first jig corresponds to outer inner end of the side portion of the first case, and an outer end of the second jig may correspond to an outer inner end of the side portion of the second case.

The width of the first jig may correspond to the first compressed width, and the width of the second jig may correspond to the second compressed width.

The side portion of the first case and the side portion of the second case may be thermally compressed against each other.

The sealing of the side portions of the first and second cases may include forming a protrusion between the receiving part and the side portion of the first case.

The protrusion may be formed on an outer surface of the first case along a longitudinal direction of the first case.

The sealing of the side portions of the first and second cases may include closely attaching the protrusion to the receiving part.

When the side portion of the first case and the side portion of the second case are compressed, a portion of the pouch case may be thrust to form the protrusion.

After the sealing of the side portions of the first and second cases, the method of manufacturing the secondary battery may further include bending the side portion of the first case and the side portion of the second case, which are compressed against each other, toward the receiving part.

The side portion of the first case and the side portion of the second case, which are compressed against each other, may be disposed within a region corresponding to the width compressed by the second jig except the width compressed by the first jig and bent about a line corresponding to a longitudinal direction of the side portion of the first case or the second case.

Each of the first case and the second case may include: a metal layer; a first resin layer disposed on one surface of the metal layer; and a second resin layer disposed on the other surface of the metal layer.

The first resin layer may be disposed on an inner surface of the pouch case and formed of one of polypropylene and polyethylene.

The first resin layer may be formed of casted polypropylene (CPP).

The second resin layer may be disposed on an outer surface and formed of nylon.

At least one of the above and other features and advantages may be realized by providing a secondary battery including: a pouch case comprising a first case and a second case, wherein a side portion of the first case and a side portion of the second case are compressed against each other; and an electrode assembly seated into a receiving part of the first case, wherein a protrusion is disposed between the receiving part and the side portion of the first case.

The side portion of the first case and the side portion of the second case may be thermally compressed against each other.

The side portion of the first case and the side portion of the second case, which are compressed against each other, may be bent toward the receiving part.

The side portion of the first case and the side portion of the second case, which are compressed against each other, may be disposed within a region in which the protrusion is disposed in the pouch case and bent about a line corresponding to a longitudinal direction of the side portion of the first case or the second case.

Each of the first case and the second case may include: a metal layer; a first resin layer disposed on one surface of the metal layer; and a second resin layer disposed on the other surface of the metal layer.

The first resin layer may be disposed on an inner surface of the pouch case and formed of one of polypropylene and polyethylene.

The first resin layer may be formed of casted polypropylene (CPP).

The second resin layer may be disposed on an outer surface and formed of nylon.

At least one of the above and other features and advantages may be realized by providing a secondary battery including: a pouch case comprising a first case and a second case, wherein a side portion of the first case and a side portion of the second case are compressed against each other; and an electrode assembly seated into a receiving part of the first case, wherein a protrusion comprising an adhesive material is disposed between the receiving part and the side portion of the first case.

The adhesive material may include casted polypropylene (CPP).

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Figure 1:
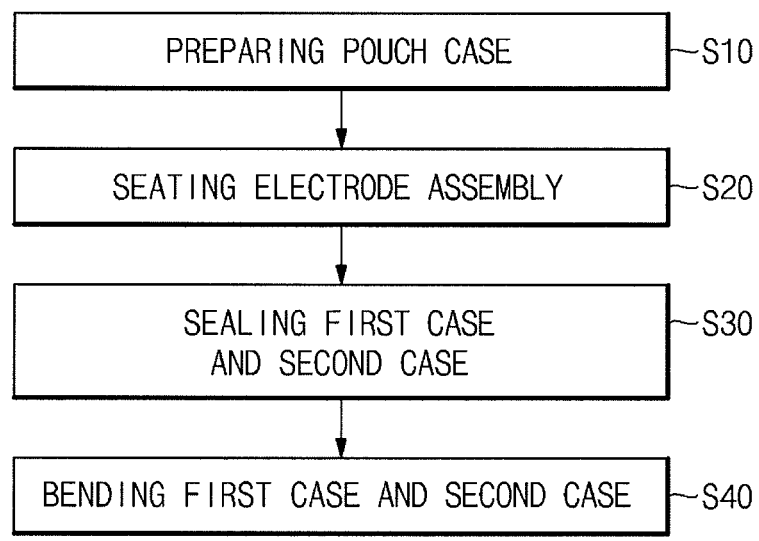
FIG. 1 illustrates a flowchart of a process of manufacturing a secondary battery according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art. Like reference numerals designate elements having like functions and operations throughout.

Hereinafter, embodiments will be described in detail with reference to the accompanying drawings.

Figure 2:
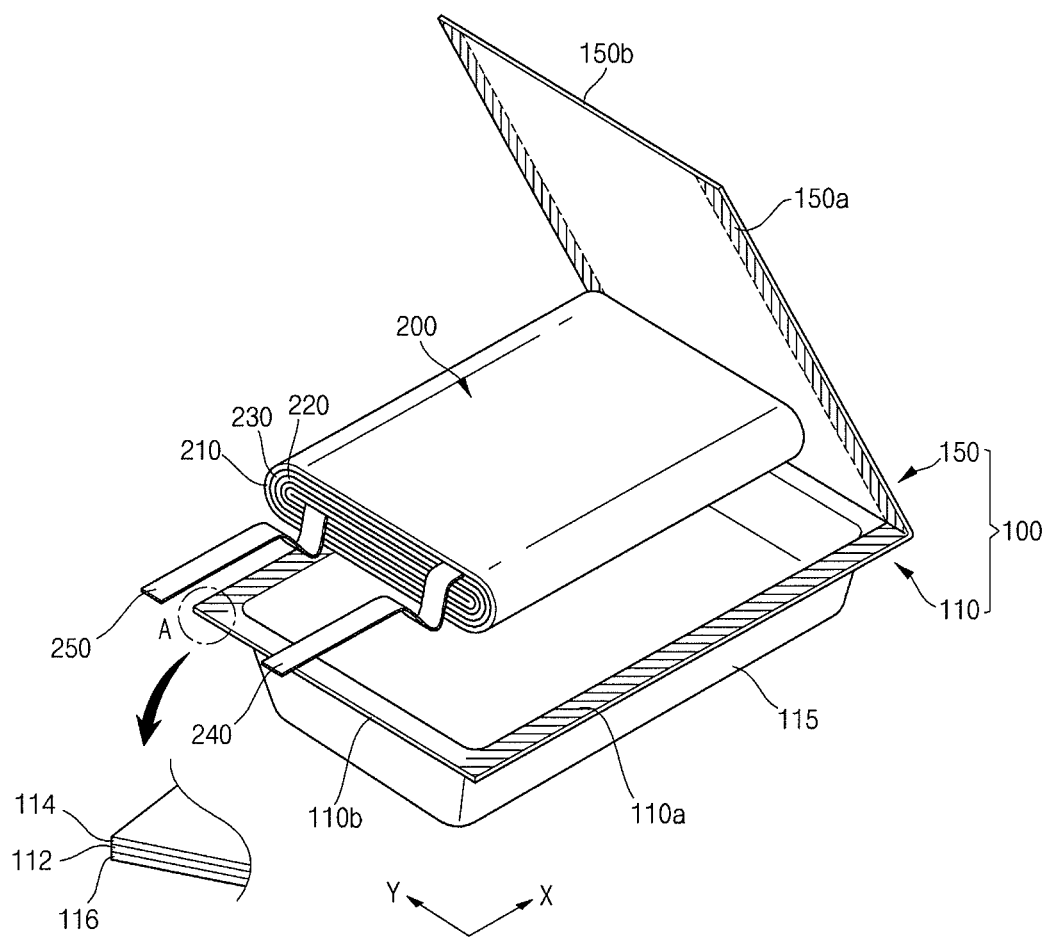
FIG. 2 illustrates an exploded perspective view of the secondary battery according to an embodiment.

FIG. 1 illustrates a flowchart of a process of manufacturing a secondary battery according to an embodiment, and FIG. 2 illustrates an exploded perspective view of the secondary battery according to an embodiment.

Referring to FIGS. 1 and 2, a process of manufacturing a secondary battery according to an embodiment includes preparing (S10) a pouch case 100, seating (S20) an electrode assembly 200, and sealing (S30) a first case 110 and a second case 150. The process of manufacturing the secondary battery may include bending (S40) the first case 110 and the second case 150 after the sealing (S30) of the first case 110 and the second case 150. Hereinafter, the process of manufacturing the secondary battery will be described in detail according to each process, and also, the secondary battery formed in each process will be described in detail. Here, an X direction of FIG. 2 represents a longitudinal direction, and a Y direction of FIG. 2 represents a width direction.

The process of manufacturing the secondary battery according to an embodiment includes the preparing (S10) of the pouch case 100 and the seating (S20) of the electrode assembly 200. In detail, the process of manufacturing the secondary battery includes the preparing (S10) of the pouch case 100 including the first case 110 and the second case 150 and the seating (S20) of the electrode assembly 200 into a receiving part or recess 115 of the first case 110.

The pouch case 100 has an approximately square shape. The pouch case 100 may include the first case 110 and the second case 150, which are folded about a longitudinal direction of a certain edge.

A pressing process is performed to form the receiving part 115 for receiving the electrode assembly 200 in an approximately central region of the first case 110. The first case 110 may have both side portions 110a, which cooperate with the second case 150 to seal the receiving part 115. Each of the both side portions of the first case 110 has a length corresponding to that of the electrode assembly 200. Also, the first case 110 has both ends respectively extending from the both side portions 110a in a longitudinal direction X. In the exploded view of a portion A of the first case 110, the first case 110 includes a metal layer 112, a first resin layer 114 disposed on one surface of the metal layer 112, a second resin layer 116 disposed on the other surface of the metal layer 112. Specifically, the metal layer 112 may be formed an aluminum thin film. The first resin layer 114 may be disposed on an inner surface of the pouch case 100 and formed of a thermally adhesive synthetic resin such as polypropylene or polyethylene. Moreover, the first resin layer 114 may be formed of casted polypropylene. The second resin layer 116 may be formed of a nylon material. The second resin layer 116 may be disposed on an outer surface of the pouch case 100 to prevent the outer surface of the pouch case 100 or the electrode assembly 200 from being damaged by an external pressure or scratch.

The second case 150 has a flat plate shape and can form a cover. The second case 150 may have both side portions 150a, which cooperate with the both side portions 110a of the first case 110 to seal the receiving part 115 at positions corresponding to those 110a of the first case 110. Like the first case 110, the second case 150 includes a metal layer 112, a first resin layer 114 disposed on one surface of the metal layer 112, a second resin layer 116 disposed on the other surface of the metal layer 112. Since the second case 150 is formed of the same material as the first case 110, its detailed descriptions will be omitted.

The electrode assembly 200 includes a first electrode plate 210, a second electrode plate 220, and a separator 230 between the first electrode plate 210 and the second electrode plate 220, which are wound in a jelly-roll type. The electrode assembly 200 may further include a first electrode tab 240, a second electrode tab 250, and an insulating tape (not shown).

A first electrode active material containing mainly lithium-based oxide is coated on both surfaces of a first electrode collector including a thin plate aluminium foil to form the first electrode plate 210. A second electrode active material containing mainly a carbon material is coated on both surfaces of a second electrode collector including a thin plate copper foil to form the second electrode plate 220. The first electrode plate 210 may include a positive electrode plate and the second electrode plate 220 may include a negative electrode plate in this embodiment, and vice versa.

The first electrode tab 240 may be disposed at a side of the first electrode plate 210 of the electrode assembly 200, and the second electrode tab 250 may be disposed at a side of the second electrode plate 220 of the second electrode tab 250. The first electrode tab 240 and the second electrode tab 250, which are wound in the jelly-roll, are parallelly disposed spaced from a certain distance from each other. Portions of the first electrode tab 240 and the second electrode tab 250 may be exposed to the outside of the pouch case 100 to electrically connect the electrode assembly 200 to a protective circuit module (not shown). The first electrode tab 240 and the second electrode tab 250 may be formed of a metal, e.g., aluminium, copper, or nickel. Also, the first electrode tab 240 and the second electrode tab 250 may be formed of a material having a high conductivity to minimize voltage drop.

The insulating tape is formed between the first and second electrode tabs 240 and 250 and the pouch case 100. The insulating tape is attached to each of portions at which the first and second electrode tabs 240 and 250 contact the pouch case 100 to reduce the risk of the first and second electrode tabs 240 and 250 being short-circuited to the pouch case 100.

The electrode assembly 200 having the above-described structure may be seated (S20) into the receiving part 115 of the first case 110, and the portions of the electrode tabs 240 and 250 may be exposed to the outside of the first case 110. Therefore, the first case 110 receiving the electrode assembly 200 and electrolyte (not shown) is covered by the second case 150.

The sealing (S30) of the first and second cases 110 and 150 will be described.

Figure 3A:
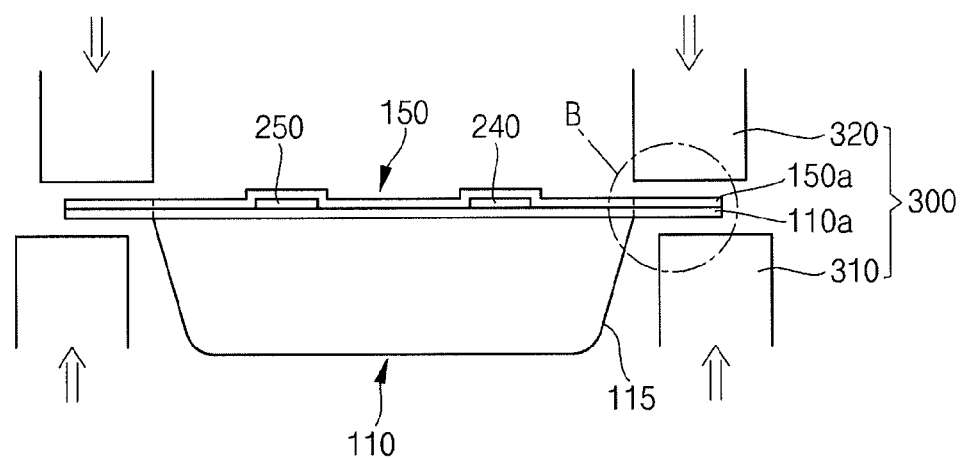
FIG. 3A illustrates a view of a process of sealing a pouch case in a secondary battery manufacturing process according to an embodiment.
Figure 3B:
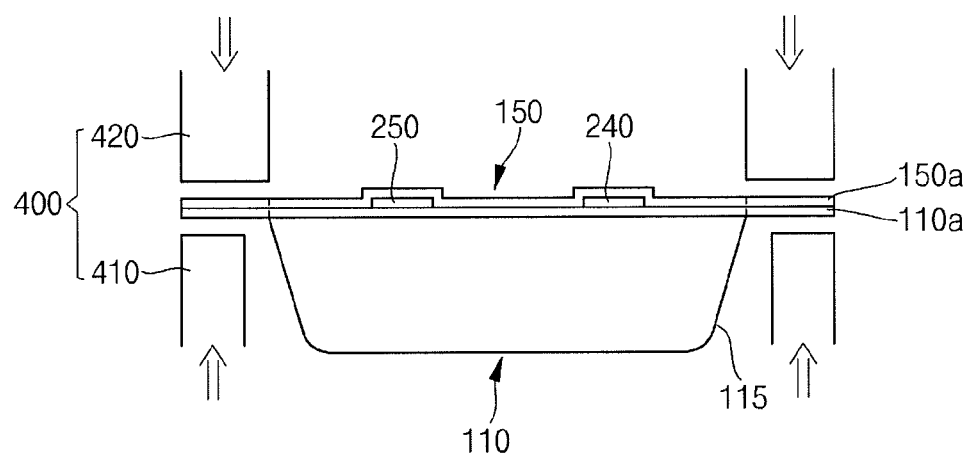
FIG. 3B illustrates a view of a process of sealing a pouch case in a secondary battery manufacturing process according to another embodiment.
Figure 4:
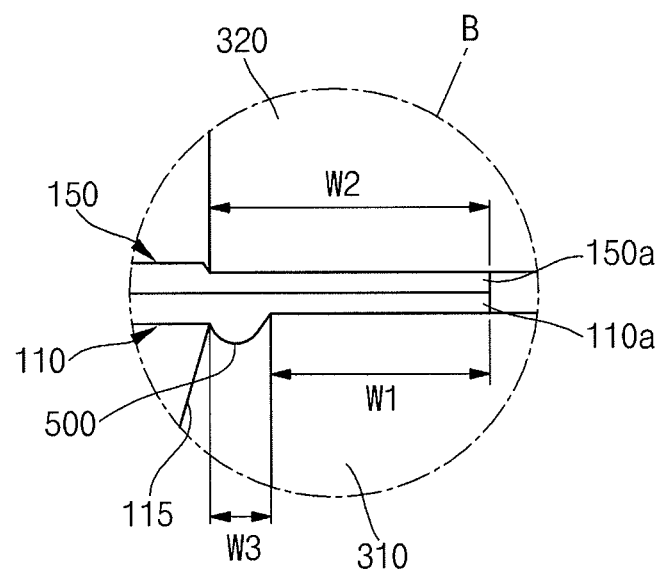
FIG. 4 illustrates an enlarged view of a portion B of FIG. 3 in a secondary battery according to an embodiment.
Figure 5:
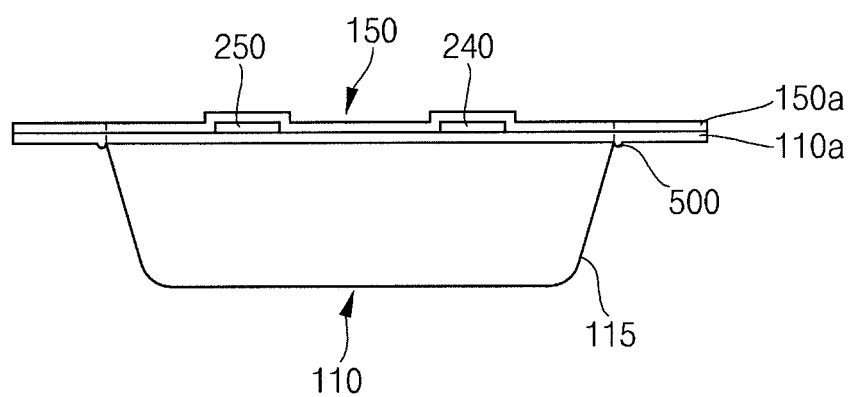
FIG. 5 illustrates a front view of a secondary battery after a pouch case is sealed in the secondary battery manufacturing process according to an embodiment.

FIG. 3A illustrates a view of a process of sealing a pouch case in a secondary battery manufacturing process according to an embodiment, and FIG. 3B illustrates a view of a process of sealing a pouch case in a secondary battery manufacturing process according to another embodiment. FIG. 4 illustrates an enlarged view of a portion B of FIG. 3 in a secondary battery according to an embodiment, and FIG. 5 illustrates a front view of a secondary battery after a pouch case is sealed in a secondary battery manufacturing process according to an embodiment.

Referring to FIGS. 2 and 3A to 5, the method of manufacturing the secondary battery includes sealing the side portion 110a of the first case 110 and the side portion 150a of the second case 150 using a jig 300.

The second case 150 is disposed to cover the electrode assembly 200 and the first case 110 in the pouch case 100. Then, the side portion 110a of the first case 110 and the side portion 150a of the second case 150 may be compressed by the jig 300 and coupled to each other. Specifically, the first resin layers 114 disposed on the inner surfaces of the first and second cases 110 and 150 may be compressed by the jig 300 to seal the pouch case 100. Here, since the heated jig 300 compresses the side portions 110a and 150a of the first and second cases 110 and 150, the side portions 110a and 150a of the first and second cases 110 and 150 may be thermally fused to each other. Hereinafter, a side portion of the pouch case 100 represents the general term for the side portions 110a and 150a of the first and second cases 100 and 150.

As shown FIG. 3A, the jig 300 may include a first jig 310 for compressing the first case 110 and a second jig 320 for compressing the second case 150. When the side portion of the pouch case 100 is compressed by the jig 300, a width W1 of the first case 110 compressed by the first jig 310 is less than a width W2 of the second case 150 compressed by the second jig 320. Specifically, the first compressed width W1 of the side portion 110a of the first case 110 is less than the second compressed width W2 of the side portion 150a of the second case 150. Here, the first compressed width W1 of the first case 110 represents a distance from an inner end of the side portion 110a of the first case 100 to a point spaced a certain distance from the inner end of the side portion 110a. Also, the second compressed width W2 of the second case 150 is equal to that of the side portion 150a of the second case 150. If the first compressed width W1 of the first case 110 is less than that W2 of the second case 150, the first and second jigs 310 and 320 are not limited to their width. A case in which the first jig 310 has the same width as the second jig 320 is described in FIG. 3A as an example. The sealing process according to this embodiment may be performed in a state where an inner end of the first jig 310 corresponds to a point spaced a certain distance from the inner end of the side portion 110a of the first case 110, and an inner end of the second jig 320 corresponds to the inner end of the side portion 150a of the second case 150.

As shown in FIG. 3B, according to another embodiment, widths of a jig 400 may be set to a width of the first case 110 to be compressed and a width of the second case 150 to be compressed to compress the pouch case 100. The side portion of the pouch case 100 may be compressed in a state where a first jig 410 compressing the first case 110 has a width less than that of a second jig 420 compressing the second case 150. In this case, the width of the second jig 420 is equal to a second compressed width, and the width of the first jig 410 is equal to a first compressed width. The sealing process according to this embodiment may be performed in a state where an inner end of the first jig 410 corresponds to a point spaced a certain distance from the inner end of the side portion 110a of the first case 110, and an inner end of the second jig 420 corresponds to the inner end of the side portion 150a of the second case 150. Also, the sealing process may be performed in a state where an outer end of the first jig 410 corresponds to an outer end of the side portion 110a of the first case 110, and an outer end of the second jig 420 corresponds to an outer end of the side portion 150a of the second case 150.

When the side portion of the pouch case is compressed by the jigs to seal the pouch case, the jigs are vertically disposed at the same position to compress the pouch case. At this time, the first resin layer disposed on the inner surface of the pouch case in a region compressed by the jig may be expanded by a pressure of the jig, and thus, a portion of the first resin layer may be thrust to the outside of the region compressed by the jig to generate corrugation lines on an outer surface of the pouch case.

The corrugation lines are formed along the longitudinal direction X of the pouch case in a region of the first case in which the side portion of the first case contacts the receiving part and a region of the second case corresponding to the region of the first case in which the side portion of the first case contacts the receiving part. The outer appearance of the pouch case may be deteriorated due to the corrugation lines.

When the pouch case is thermally compressed, the corrugation lines are compressed, and then hardened. Thus, when the side portion of the pouch case is bent toward the receiving part, the hardened corrugation lines may prevent the pouch case from being smoothly bent. Furthermore, the corrugation lines generated on the second case may further prevent the pouch case from being bent.

In addition, since the corrugation lines have shapes protruding from the outer surface of the pouch case, it is harder to miniaturize the secondary battery as the corrugation lines increase the volume of the case. Thus, the density of the secondary battery relative to the capacity of the electrode assembly decreases.

Also, since the width W1 of the side portion 110a of the first case 110 compressed by the first jig 310 is less than the width W2 of the side portion 150a of the second case 150, a region W3 that is not compressed by the jigs may be generated between the side portion 110a of the first case 110 and the receiving part 115 of the first case 110. In this embodiment, corrugation lines generated in the region in which the pouch case 100 is not compressed may be defined as a protrusion 500.

The side portion 110a of the first case 110 and the side portion 150a of the second case 150 are compressed to expand a portion of the pouch case 100, i.e., a portion of the first resin layer 114 due to the pressure of the jigs. As a result, the portion of the first resin layer may be thrust to the outside of the region compressed by the jig to form the protrusion 500. Thus, the protrusion 500 is formed on an outer surface of the first case 110 along a longitudinal direction of the first case 110. Also, the protrusion 500 is formed between the side portion 110a of the first case 100 and the receiving part 115, and may be closely attached to the receiving part 115.

That is, when the side portion of the pouch case 100 is compressed according to the above-described method, the corrugation lines may be generated in only the region W3 between the side portion 110a of the first case 110 and the receiving part 115, but all of the regions of the first case 110 and the second case 150. Since the compressed side portion of the pouch case 100 is bent toward the receiving part 115, the protrusion 500 is covered by the compressed side portion of the pouch case 100. Thus, since the corrugation lines are not formed on the outer surface of the pouch case 100, the outer appearance of the pouch case 100 may be more elegant.

In addition, since the first jig 310 and the second jig 320 correspond to each other, the compressed area may be reduced when compared to a typical method, thereby reducing an amount of the generated corrugation lines. Thus, the volume due to the corrugation lines may be reduced to improve the density of the secondary battery.

The bending (S40) of the first case 110 and the second case 150 will be described.

Figure 6:
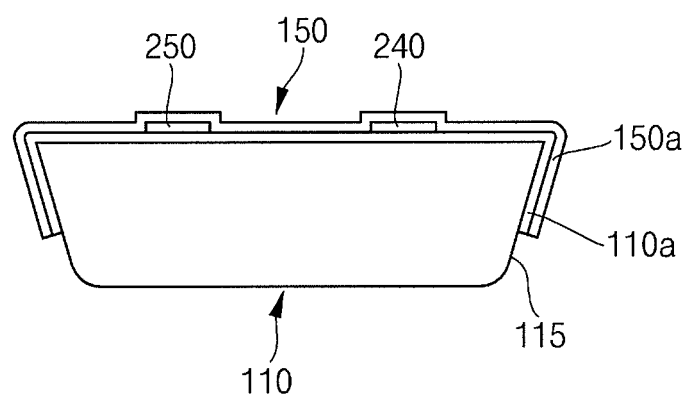
FIG. 6 illustrates a front view of a secondary battery after a side portion of a pouch case is bent in the secondary battery manufacturing process according to an embodiment.

FIG. 6 illustrates a front view of a secondary battery after a side portion of a pouch case is bent in a secondary battery manufacturing process according to an embodiment.

Referring to FIGS. 4 and 6, the process of manufacturing the secondary battery includes bending the side portion 110a of the first case 100 and the side portion 150a of the second case 150, which are compressed against each other, toward the receiving part 115.

In detail, the side portion 110a of the first case 100 and the side portion 150a of the second case 150, which are compressed against each other, may be disposed within a region corresponding to the width compressed by the second jig 320 except the width compressed by the first jig 310. Also, the side portion 110a of the first case 100 and the side portion 150a of the second case 150 may be bent about a line corresponding to the longitudinal direction of the side portion 110a or 150a of the first case 110 or the second case 150. When the above-described line is defined as a baseline, the baseline is disposed within a region of the width W3 of FIG. 4.

When the side portion of the pouch case 100 is bent toward the receiving part 115, the hardened corrugation lines are not generated in the second case 150. Thus, the bending of the side portion of the pouch case 100 may be smoothly performed. Therefore, the side portion of the pouch case 100 may be easily wound in the jelly roll shape, like the side portion of the electrode assembly 200.

In the secondary battery and the process of manufacturing the secondary battery according to the embodiments, when the side portion of the pouch case is compressed, the upwardly and downwardly compressed widths may be different from each other to reduce the amount of the corrugation lines on the pouch case during the sealing process.

Thus, since the amount of the firmly hardened corrugation lines is reduced, the side portion of the pouch case to be bent in a direction crossing the corrugation lines may be easily bent. In addition, the outer appearance of the pouch case 100 may be elegant.

Also, since the volume occupied by the corrugation lines may be reduced, the total volume of the secondary battery with respect to the capacity of the electrode assembly. Therefore, the capacity density of the secondary battery may be improved.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A secondary battery comprising:
a pouch case comprising a first case having a receiving part and a second case, wherein a side portion of the first case that has a first thickness and a side portion of the second case that has a second thickness are compressed against each other and adhere to each other wherein the side portion of the first case has a compressed area having a third thickness less than the first thickness with a width of W1 and the side portion of the second case has a compressed area having a fourth thickness less than the second thickness with a width of W2 that is greater than the width W1; and
an electrode assembly seated into the receiving part of the first case,
wherein a protrusion is disposed between the receiving part and the side portion of the first case wherein the protrusion extends outwardly from the receiving part of the first case at a location adjacent an inner edge of the compressed area of the first case so that the combined thickness of the first and second case at the protrusion is greater than both the combined thickness of the first and second case in the compressed area having a width of W1 and wherein the first and second case are formed of a metal layer and a resin layer and wherein a portion of the protrusion that extends outward from the receiving part of the first case is formed substantially entirely of the resin that forms the at least one layer of resin.

2. The secondary battery as claimed in claim 1, wherein the protrusion is disposed on an outer surface of the first case along a longitudinal direction of the first case.

3. The secondary battery as claimed in claim 1, wherein the protrusion is closely attached to the receiving part.

4. The secondary battery as claimed in claim 1, wherein the side portion of the first case and the side portion of the second case are compressed so as to adhere and the protrusion is formed of material from the compressed area of the first case.

5. The secondary battery as claimed in claim 1, wherein the side portion of the first case and the side portion of the second case are thermally compressed against each other so as to adhere.

6. The secondary battery as claimed in claim 1, wherein the side portion of the first case and the side portion of the second case, which are compressed against each other, are bent toward the receiving part.

7. The secondary battery as claimed in claim 6, wherein the side portion of the first case and the side portion of the second case, which are compressed against each other, are disposed within a region in which the protrusion is disposed in the pouch case and bent about a line corresponding to a longitudinal direction of the side portion of the first case or the second case.

8. The secondary battery as claimed in claim 1, wherein each of resin layer of the first case and the second case comprises:
 a first resin layer disposed on one surface of the metal layer; and
 a second resin layer disposed on the other surface of the metal layer.

9. The secondary battery as claimed in claim 8, wherein the first resin layer is disposed on an inner surface of the pouch case and formed of one of polypropylene and polyethylene.

10. The secondary battery as claimed in claim 8, wherein the first resin layer is formed of casted polypropylene (CPP).

11. The secondary battery as claimed in claim 8, wherein the second resin layer is disposed on an outer surface and formed of nylon.

12. A secondary battery comprising:
 a pouch case comprising a first case having a receiving part and a second case, wherein a first width of a side portion of the first case and a second width of a side portion of the second case are compressed against each other so as to and adhere to each other; and
 an electrode assembly seated into the receiving part of the first case,
 wherein a protrusion comprising only an adhesive material is disposed between the receiving part and the side portion of the first case at a location adjacent an inner edge of the first width of the side portion and so that the combined thickness of the side portions of the first and second case at the protrusion is greater than the combined thickness of the side portions of the first and second case that are compressed against each other.

13. The secondary battery as claimed in claim 12, wherein the adhesive material comprises casted polypropylene (CPP).

* * * * *